Sept. 19, 1950      D. LABINO      2,523,030
ELECTRIC GLASS FURNACE
Filed Oct. 30, 1948
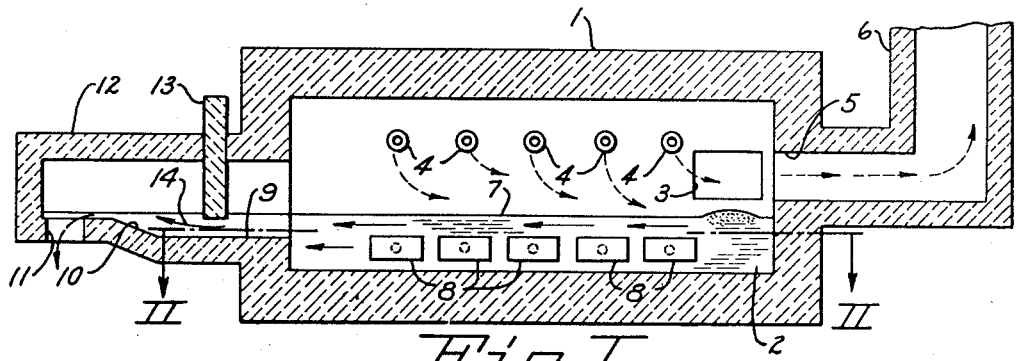
Fig. I
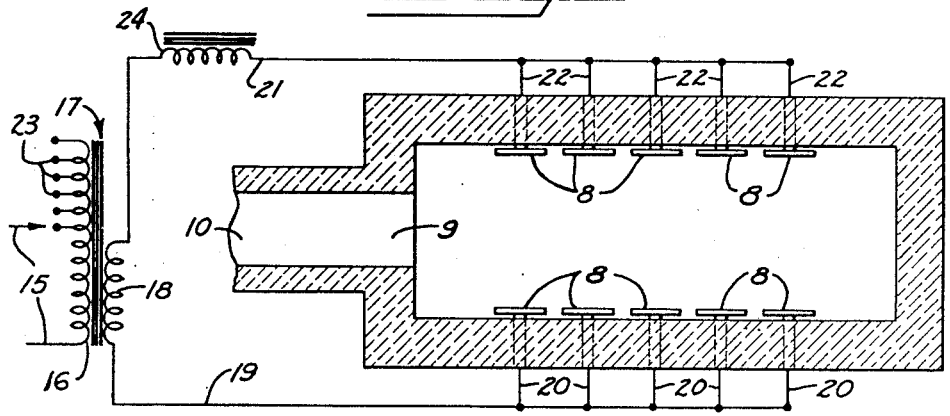
Fig. II
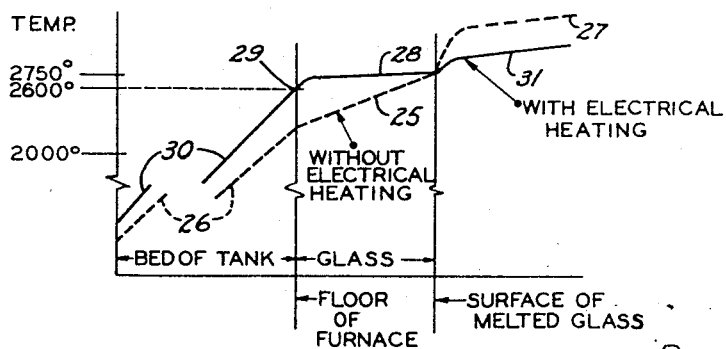
Fig. III
INVENTOR.
Dominick Labino
BY
Marshall, Marshall & Leonard
ATTORNEYS Patented Sept. 19, 1950

2,523,030

UNITED STATES PATENT OFFICE 2,523,030

ELECTRIC GLASS FURNACE

Dominick Labino, Maumee, Ohio, assignor to Glass Fibers, Inc., Waterville, Ohio, a corporation of Ohio Application October 30, 1948, Serial No. 57,585

7 Claims. (Cl. 13—6)

This invention relates to furnaces for the manufacture of glass and in particular to a furnace in which glass of high uniformity and high quality may be economically produced.

In the manufacture of glass, particularly flint glass or similar glass having a high melting point, it is necessary to operate the furnace at considerably higher temperatures than occur in the manufacture of the softer varieties of glass. The difficulties encountered in operating a furnace at the higher temperatures increase much faster than the increase in temperature would indicate. This follows because the furnace particularly when the higher melting point glasses are being produced is operated at temperatures that approach the maximum allowable temperature limit of the refractory materials employed in the construction of the tank. As a result there is a large increase in the rate of deterioration of the furnace with a small increase in the operating temperature.

Another difficulty that must be overcome particularly when the glass produced by the furnace is to be remelted in later processing operations is that the glass must be thoroughly "cooked" so that it is not only homogenous but is also free from gas. The last requirement is particularly important because if glass is produced without sufficient cooking, that is, without being held for sufficient time above a certain minimum temperature determined by the composition of the glass, and is later raised to a higher temperature additional gas will be driven out. The evolution of the additional gas causes a foaming or boiling action which interferes with and may easily disrupt later processing operations.

Various attempts have been made to eliminate this later evolution of gas, sometimes known as "reboil," by raising the temperature in the furnace proper and by auxiliary heating employing electric currents designed to produce convection currents within the melted glass so as to subject all portions of the glass to nearly the same treatment. It is difficult to control such convection currents and it often happens that some of the raw materials after being melted slip through the furnace to the discharge opening without having reached the desired minimum temperature or having been held at the high temperature for a sufficient length of time. These portions of the output still carry sufficient gas either dissolved in the material or included in the partially cooked ingredients so that when the glass is later reheated in a subsequent process the additional gas is given off and in its evolution produces the undesirable foaming or boiling action.

Furnaces have been constructed to employ electrical currents flowing in the melted glass as the only source of heat within the glass. These furnaces are difficult to control because of the large amount of heat required to melt the materials in the first place and because of the pronounced convection currents that are set up in the glass whenever the temperature of the lower strata of melted glass exceeds the temperature of the upper strata. Another factor causing difficulty in electrical heating is the negative temperature coefficient of resistance of the melted glass. This property of the glass tends to promote channeling the electric current through the glass, with the hotter portions of the glass carrying the current and becoming hotter and the cooler portions taking less current and consequently receiving less heat. The rate of conduction of heat through the melted glass in the absence of convection currents is insufficient to overcome the channeling effects and provide uniform heat distribution.

Furnaces may also be operated by gas or oil firing in which the volatized fuel and sufficient air to support combustion are introduced into the furnace above the level of the glass and the products of combustion exhausted through a stack connected to one end of the furnace. In this method of operation the glass is melted and heated by the heat directed downwardly from the burning fuel as well as by the heat radiated from the ceiling and side walls of the furnace. This method of operation is also limited in its capability of producing satisfactory glass. The difficulty occurs because the upper strata and surface of the glass receive all of the heat and must transmit that heat to the lower strata by conduction through the glass. Convection currents may be set up in the glass if the heat is not uniformly distributed across the exposed area of the melted glass. In this type of heating it is difficult to make sure that all of the glass passing through the furnace receives the same heat treatment both as to time and temperature. What usually happens is that the upper strata, which in an ordinary furnace may be as much as 400° hotter than the strata adjacent the floor of the furnace, tend to flow much easier and hence pass through the furnace much quicker than those strata along the floor of the furnace. If the discharge opening of the furnace is near the surface of the glass then the output of the furnace is limited as to quantity because of the stagnation of the lower strata. If the output is taken from the floor of the furnace or near the floor the quality of the finished glass is impaired because of the inclusion of partially cooked glass that has passed through the furnace along the floor thereof.

It has been proposed to include electric heating at the discharge of the furnace to correct this latter difficulty. This again is not satisfactory, because in order for the electric heating to compensate for the deficiency of the previous heating in the furnace it must act on each increment of melted glass according to the prior thermal history of that increment of glass. Therefore, at best, the electric heating can only add a given quantity of heat to each increment as it passes along but is not capable of differentiating between increments having different thermal histories so as to produce a uniform output.

The principal object of this invention is to provide an improved glass melting furnace and method of operating the furnace for producing a high quality, highly uniform glass.

Another object of the invention is to operate a glass melting furnace with a relatively shallow burden of melted glass in which both the upper and the lower strata of the glass are independently heated to maintain a substantially uniform temperature throughout the greater portion of the melted glass without the production of convection currents.

A still further object of the invention is to process the glass making materials into finished glass by passing the materials through the length of a furnace in which upper and lower strata of the material are independently heated to maintain a substantially uniform temperature across any cross section and in which the material is slowly passed through the furnace with all portions of the glass to be discharged from the furnace proceeding at a substantially uniform rate.

A still further object is to provide a method of and apparatus for processing glass in which the glass is melted and cooked during its passage through a melting and cooking tank and is then discharged directly to a forehearth leading to a feeding spout.

A still further object is to provide a method of processing glass in which lower strata of the glass throughout a greater part of the length of the processing container are heated by the passage of electric current therethrough and the magnitude of the electric current is controlled so that the temperature of the lower strata is substantially the same as but not higher than the temperature of the upper strata of the melted glass.

A still further object of the invention is to provide a glass melting furnace, in which glass is processed without the aid of convection currents, with a discharge opening adapted to draw the melted glass from the intermediate and upper strata of the melted glass.

More specific objects and advantages are apparent from the following description of an improved furnace that may be operated according to the invention.

According to the invention a glass melting furnace is constructed so that glass making materials may be fed in at one end of the furnace and melted by the heat of combustion of fuel supplied to the furnace. The heat of combustion is evenly distributed throughout the furnace and serves to maintain the surface of the melted glass within the furnace at processing temperature as well as to melt the incoming raw materials. In addition to the surface heating by combustion a plurality of electrodes are evenly spaced along each side of the furnace at a small elevation above its floor and an electric current is passed between the electrodes to heat the lower strata of melted glass contained within the furnace. The magnitude of the current is controlled so that a minimum of convection currents exist in the glass. As a result the melted glass materials flow slowly lengthwise through the furnace with at least the intermediate and upper strata maintained at substantially the same temperature. The discharge of the furnace is taken from the intermediate and upper strata, that is from a level above that of the electrodes, so that all portions of the glass drawn from the discharge opening have received very nearly if not exactly the same heat treatment both as to time and as to temperature.

This method of operating the furnace is conducive to long life of the furnace because the temperature in the atmosphere above the melted glass need not be much greater than the temperature of the glass itself. The only requirement is that sufficient heat be available to melt the incoming raw materials. The electric current flowing through the glass near the floor of the furnace generates enough heat to supply the heat loss through the lower side walls and floor of the furnace. By electrically supplying the heat to the lower strata the heat gradient within the melted glass may be materially reduced and in fact reversed if too much electric current is used. Insufficient electric current is unsatisfactory because it throws too much of a burden on the combustion heating, thereby requiring unusually high temperatures above the surface of the glass in order to conduct sufficient heat into the glass. Too much electric current sets up convection currents in the glass and also tends to heat the lower strata so that heat actually flows from the lower strata upwardly toward the surface of the glass which then becomes overheated. The best results are obtained by regulating the current so that it supplies just enough heat to counteract the loss of heat through the floor of the furnace. Under this condition there are no temperature gradients within the furnace tending to set up convection currents and yet the entire cross section of the furnace through which the melted glass must pass is maintained at substantially the same temperature.

With this type of control the desired temperature may be easily maintained throughout the melted glass and also the thickness or depth of the pool of melted glass may be much less than the depth in conventional furnaces. This reduced depth facilitates the separation and elimination of gas, and, with a furnace the length of which is several times the width, contributes to production of practically gas free glass.

The improved furnace is illustrated in the drawings.

In the drawings:

Figure I is a vertical longitudinal section of the improved furnace.

Figure II is a horizontal section taken substantially along the line II—II of Figure I.

Figure III is a diagram in the nature of a graph showing the temperature distribution through the bed of the furnace and the pool of melted glass within the furnace.

These specific figures and the accompanying description are intended merely to illustrate the invention and not to limit its scope.

The improved furnace comprises an enclosure 1 constructed of blocks of refractory material as commonly employed in the construction of glass melting furnaces. The bottom portion of the enclosure constitutes a tank 2 adapted to hold the melted glass materials during the processing of the glass. The raw materials for the glass are introduced into the enclosure 1 through an opening 3 cut through a side wall at an elevation substantially above the level of the melted glass contained within the tank 2. A plurality of burners 4 are arranged in the side walls of the enclosure 1 for projecting gas or vaporifized oil mixed with air into the upper portion of the enclosure 1 where it is burned. The products of combustion are exhausted through an opening 5 at the feeding end of the furnace chamber 1 and are carried up a stack or chimney 6 and discharged to the atmosphere.

As the glass making materials introduced through the opening 3 are subjected to the heat of combustion they melt and settle into a pool of melted glass 7 contained within the tank 2. The upper strata of the melted glass 7 are heated by the combustion of the fuel while the lower strata are heated by electric currents flowing between electrodes 8 evenly spaced along the greater portion of the length of the side walls of the tank 2. The electrodes 8 are preferably made of molybdenum because of its high melting point and inertness to the melted glass. The electrodes 8 to have satisfactory life must be water cooled.

The melted glass 7 after passing between the electrodes 8 is discharged through a shallow gate 9 to a forehearth 10 of the furnace. It should be noted that there is no refining chamber as is usually employed in glass making furnaces. After crossing the forehearth 10 the glass 7 is discharged through a downwardly directed opening 11 and as it is discharged it may be cut and molded into small pieces or marbles that are convenient to handle and to store preparatory to the next step in the processing of the glass.

The forehearth 10 has a cover 12 through which a vertically adjustable skimmer block 13 is inserted. The skimmer block 13, which is located immediately outside the gate 9, dips into the upper strata of melted glass 7 and thus serves to stop the flow of any slag or scum from the furnace into the forehearth 10. The gate 9 and skimmer block 13 constitute a discharge opening leading from the intermediate and upper strata of the melted glass. The flow of the glass through the furnace is indicated by arrows 14 leading from the region immediately beneath the opening 3, through the furnace, the shallow gate 9, under the skimmer block 13, across the forehearth 10 and out the opening 11.

Alternating electric current is suitable for heating the lower strata of the glass. Since the amount of power required is quite large and the resistance of the melted glass is quite low it is necessary to insert a transformer into the circuit between the electrodes 8 and any ordinary commercial electrical power distributing system. In this circuit, schematically illustrated in Figure II, electrical power is fed through leads 15 to a primary winding 16 of a transformer 17. The transformer 17 has a secondary winding 18 which is connected through a lead 19 and branch leads 20 to the electrodes 8 located along one side of the furnace and through a lead 21 and branch leads 22 to the electrodes 8 located along the other side of the furnace. The magnitude of the currents supplied to the furnace are controlled by varying the applied voltage. To this end the primary winding 16 of the transformer 17 has taps 23 so that the voltage output of the secondary winding 18 may be varied as required.

If the decrease in specific resistance of the glass with an increase in temperature, the effect of the negative coefficient of resistance, is sufficient to cause instability an impedance 24, which may be an inductive reactor with or without a saturable core, may be included in one of the leads to the furnace either on the primary or secondary side of the transformer 17. If desired, further control may be exercised by including reactors or resistors in the leads to the individual electrodes.

As illustrated the reactor is included in the lead 21. The reactor serves to limit the current flow to the furnace in the event that the resistance should decrease. In this arrangement it is possible by proper selection of the size of the reactor in comparison to the resistance of the glass to secure substantially uniform heating over a range of glass temperatures and resistances. This is possible because the heat generated in the glass is equal to the product of the square of the current times the electrical resistance of the glass. If the current is maintained constant regardless of resistance the heat generated in the glass is directly proportional to the resistance and therefore decreases with a decrease in resistance corresponding to an increased temperature. If the voltage applied to the electrodes is maintained constant the current increases with a decrease in resistance and the power or heat input into the glass varies inversely as the resistance. Thus in one case the power input decreases with resistance and in the other increases with a decrease in resistance. By inserting an impedance element, preferably a reactor—an impedance that does not consume power, in series with the electrodes so that the current flow is partially controlled by means other than the resistance of the glass and the applied voltage, the power input to the glass may be automatically controlled and maintained substantially constant over a range of glass temperatures.

Referring now to Figure III, which is a diagram in the nature of a graph showing the temperature existing at various points in the melted glass and in the bed of the tank 2 of the furnace, the temperature at the upper surface of the glass 7 is shown as being approximately 2750° F. while the temperature at the floor of the tank is approximately 2350° F. when the furnace is operated without the benefit of electrical heating. These temperatures are indicated by a line 25 representing the vertical temperature gradient through the glass 7. Heat is lost through the floor of the furnace, the bottom of the tank, as a result of the temperature difference between the hot melted glass in the tank and the relatively much colder atmosphere or structure beneath the furnace. The temperature gradient through the bed of the furnace is shown by a line 26 in the drawing. The gradients shown by the lines 25 and 26 have slopes that vary inversely as the heat conductivity of the melted glass 7 and of the refractory material employed in the construction of the tank 2.

The temperature in the gas immediately above the surface of the glass, represented by a line 27, must be much higher than the temperature at the surface of the glass in order to transfer sufficient quantities of heat into the glass to make up that heat which is lost through the bed of the furnace.

When electrical heating is added, with electrodes spaced along the side walls of the furnace and above its floor, the temperature gradient through the intermediate and upper strata of the glass is materially reduced. This reduced gradient is indicated by a line 28 in Figure III. Near and below the level of the electrodes 8 the temperature gradient increases until it is substantially equal to the gradient represented by the line 25, the gradient when no electrical heating is employed. This result follows because the lower strata of glass receive heat from above and conduct it downwardly at a rate determined by the conductivity and not by the source of heat above them. As before, heat is lost through the bed of the furnace and, since the bed of the furnace with electrical heating is maintained at a higher temperature, the corresponding heat gradient and heat flow through the bed of the furnace, represented by a line 30 of the drawing, are somewhat greater than the heat flow without the electrical heating. The difference in heat flow and gradients is caused entirely by the increased temperature of the glass adjacent the bed of the furnace.

Since the reduced gradient in the intermediate and upper strata of the glass when electrical heating is employed represents a low rate of heat transfer from the surface of the glass downwardly through the glass, it follows that the temperature of the gas immediately above the glass need not be as high. Thus gas temperatures represented by a line 31 in the drawing are sufficient to provide the heat required to maintain the temperature at the surface of the glass.

By employing a source of heat for independently heating the lower strata of the melted glass and maintaining that strata at a temperature substantially equal to but not higher than the temperature of the surface of the glass, highly uniform conditions may be maintained throughout the pool of melted glass. As long as the conditions are uniform with a slight temperature gradient having higher temperatures in the upper strata there is practically no tendency to produce convection currents and the only fluid motion is the steady flow from the melting zone at the inlet end of the furnace to the forehearth 10 and out through the opening 11. Since only this single flow need be considered in determining the time during which the glass ingredients are held in melted condition and since this time may be controlled by controlling the rate at which the glass is drawn from the furnace and the rate at which raw materials are added it follows that very uniform operating conditions may be selected and maintained to produce a high quality uniform product.

Attention was previously called to the fact that the improved furnace has no refining chamber. This is of peculiar advantage in the production of glass that is to be reheated in subsequent processing operations. As the glass is melted and heated and slowly flows through the heating chamber gases are given off. A refining chamber is usually employed to give the gas bubbles more time to escape. However the glass is at a lower temperature in the refining chamber and gas, particularly water vapor, tends to dissolve in the glass. The solubility increases as the glass temperature drops. Upon reheating the gas is driven out of solution forming bubbles in the glass. These, if present in quantities, produce serious foaming action. By the elimination of the refining chamber, which is ordinarily operated at a slightly lower temperature than the melting chamber and is intended to allow bubbles to escape, the glass is given little time to absorb by solution any water vapor present. Thus the output of this furnace, while it contains some bubbles which would detract from its value for some applications, is remarkably free of dissolved gas that would be evolved during a subsequent melting of the glass.

It may be noted from Figure III that the extreme lower stratum of the melted glass is not maintained at quite the same temperature as the intermediate and upper strata. It is therefore desirable that the discharge gate 9 of the furnace be located so as to draw from the intermediate and upper strata rather than from the extreme lower stratum. In this manner a stagnant layer of slightly cooler glass may be maintained in the lower portion of the tank as a means of protecting the floor of the tank from extremely high temperatures. Furthermore the reduced temperature of the gas above the glass made possible by the electrical heating tends to prolong the life of the roof and side walls of the furnace. It may be also noted there is heat loss through the side walls and that the glass immediately adjacent thereto is slightly cooler than the glass in the interior of the pool thus protecting the side walls.

In experiments carried out to determine the design and operating procedure of a satisfactory furnace it was found that furnaces producing approximately the same grade of glass required rebuilding after four or five months operation. The rapid deterioration of these furnaces appeared to be the result of the very high temperatures required above the glass to transmit the required heat into the glass. In a test a furnace constructed and operated according to the invention was still in satisfactory operating condition after an 18 month run. The increased life to a large measure is a result of the lower temperature of the gas over the glass which at the lower temperature does not rapidly erode the walls and ceiling of the chamber.

The improved method of operating the improved furnace results in long furnace life and makes possible the economical production of a high quality flint glass that may be subsequently remelted for further processing without the evolution of gas that would cause foaming in the subsequent processing operations.

Various modifications may be made in the specific details of the structure and proportions of the furnace without departing from the spirit and scope of the invention.

Having described the invention, I claim:

1. The method of continuous flow manufacture of glass that comprises, establishing a pool of glass in a glass-making tank having a discharge opening for molten glass at one end of the tank, introducing glass-making materials into the pool at the opposite end of the tank to cause flow of glass toward the discharge opening in the tank, heating substantially uniformly the surface of the pool and melting said material by heat from combustion applied over the surface of the pool at uniformly distributed points between the point of introduction of the glass-making materials and the discharge end of the tank, additionally heating substantially uniformly the pool in a strata substantially below the surface of the pool by electric currents flowing in the glass in the strata uniformly distributed between the point of introduction of the glass-making materials and the discharge end of the tank, controlling the magnitude of the electric currents to maintain a small temperature gradient between the combustion heated surface strata and the electrically heated strata in which the temperature of the electrically heated strata is less than the temperature of the combustion heated surface strata, and drawing off glass from the pool at the discharge end of the tank from the strata above that which is heated electrically and below that at the surface of the pool heated directly by combustion heat.

2. The method of continuous flow manufacture of glass that comprises, establishing a pool of glass in a glass-making tank having a discharge opening for molten glass at one end of the tank, introducing glass-making materials into the pool at the opposite end of the tank to cause flow of glass toward the discharge opening in the tank, heating substantially the surface of the pool and melting said material by heat from combustion applied over the surface of the pool at uniformly distributed points between the point of introduction of the glass-making materials and the discharge end of the tank, additionally heating substantially uniformly the pool in a strata substantially below the surface of the pool by electric currents flowing in the glass in the strata uniformly distributed between the point of introduction of the glass-making materials and the discharge end of the tank, controlling the electric currents so that any temperature gradient between the combustion heated surface strata and the electrically heated lower strata is minimized but is not reversed, and drawing off glass from the pool at the discharge end of the tank from the strata above that which is heated electrically and below that at the surface of the pool heated directly by combustion heat.

3. The method of continuous flow manufacture of glass that comprises, establishing a pool of glass in a glass-making tank having a discharge opening for molten glass at one end of the tank, introducing glass-making materials into the pool at the opposite end of the tank to cause flow of glass toward the discharge opening in the tank, heating substantially uniformly the surface of the pool and melting said material by heat from combustion applied over the surface of the pool at uniformly distributed points between the point of introduction of the glass-making materials and the discharge end of the tank, additionally heating substantially uniformly the pool in a strata substantially below the surface of the pool by electric currents flowing in the glass in the strata uniformly distributed between the point of introduction of the glass-making materials and the discharge end of the tank, and drawing off glass from the pool at the discharge end of the tank from the strata above that which is heated electrically and below that at the surface of the pool heated directly by combustion heat.

4. The method of continuous flow manufacture of glass that comprises, establishing a pool of glass in a glass-making tank having a discharge opening for molten glass at one end of the tank, introducing glass-making materials into the pool at the opposite end of the tank to cause flow of glass toward the discharge opening in the tank, heating substantially uniformly the surface of the pool and melting said material by heat from combustion applied over the surface of the pool at uniformly distributed points between the point of introduction of the glass-making materials and the discharge end of the tank, causing counterflow of the products of combustion and the glass in the tank, additionally heating substantially uniformly the pool in a strata substantially below the surface of the pool by electric currents flowing in the glass in the strata uniformly distributed between the point of introduction of the glass-making materials and the discharge end of the tank, and drawing off glass from the pool at the discharge end of the tank from the strata above that which is heated electrically and below that at the surface of the pool heated directly by combustion heat.

5. The method of continuous flow manufacture of glass that comprises, establishing a pool of glass in a glass-making tank having a discharge opening for molten glass at one end of the tank, introducing glass-making materials into the pool at the opposite end of the tank to cause flow of glass toward the discharge opening in the tank, substantially uniformly heating by combustion of combustible fuels the surface of the pool encompassing substantially the entire surface area of the pool thereby establishing a combustion heated strata in the pool at the surface of the pool, establishing a strata in the pool substantially uniformly heated by flow of electric currents through the strata substantially below the surface of the pool and substantially co-extensive with the combustion heated surface strata, and drawing off glass from the pool at the discharge end of the tank from a strata above that which is heated electrically and below that at the surface of the pool that is heated directly by combustion heat.

6. In a furnace for the manufacture of glass, a tank for holding a pool of melted glass, an enclosure over the tank, said tank having an opening through which glass-making materials may be introduced near one end of the tank, means for introducing combustible material into the tank above the pool therein and disposed at uniformly distributed points along substantially the entire length of the tank and over the pool for melting the glass-making materials and heating uniformly the surface of the pool of melted material in the tank, electrodes in said tank at a level substantially below the surface of a pool in the tank in a plane substantially parallel to the surface and extending substantially co-extensive with the distribution of said combustible material introducing means along the length of the tank, and a discharge opening in the end of said tank opposite the point of introduction of glass-making material, said discharge opening having the lower edge thereof substantially at the level of the upper edge of said electrodes and the upper edge thereof substantially below the surface of the pool of melted materials in the tank.

7. In a furnace for the manufacture of glass, a tank for holding a pool of melted glass, an enclosure over the tank, said tank having an opening through which glass-making materials may be introduced near one end of the tank, means for introducing combustible material into the tank above the pool therein and disposed at uniformly distributed points along substantially the entire length of the tank and over the pool for melting the glass-making materials and heating uniformly the surface of the pool of melted material in the tank, electrodes in said tank at a level substantially below the surface of a pool in the tank in a plane substantially parallel to the surface and extending substantially co-extensive with the distribution of said combustible material introducing means along the length of the tank, means for supplying electrical current to the electrodes at a voltage that varies with the resistance of the glass, an impedance connected between said electrical supply means and the electrodes to limit the variation in current flow resulting from changes in resistance of the glass, and a discharge opening in the end of said tank opposite the point of introduction of glass-making material, said discharge opening having the lower edge thereof substantially at the level of the upper edge of said electrodes and the upper edge thereof substantially below the surface of the pool of melted materials in the tank.

DOMINICK LABINO.

REFERENCES CITED

The following references are of record in the file of this patent:

UNITED STATES PATENTS

| Number | Name | Date |
|---|---|---|
| 762,270 | Benjamin | June 14, 1904 |
| 1,610,377 | Hitner | Dec. 14, 1926 |
| 1,820,248 | Raeder | Aug. 25, 1931 |
| 1,928,289 | Henry et al. | Sept. 26, 1933 |
| 1,944,855 | Wadman | Jan. 23, 1934 |
| 2,089,690 | Cornelius | Aug. 10, 1937 |
| 2,122,469 | Hitner | July 5, 1938 |
| 2,159,361 | Atkinson et al. | May 23, 1939 |
| 2,225,616 | Borel | Dec. 24, 1940 |
| 2,314,956 | Slayter et al. | Mar. 30, 1943 |
| 2,413,037 | De Voe | Dec. 24, 1946 |

FOREIGN PATENTS

| Number | Country | Date |
|---|---|---|
| 239,718 | Switzerland | Feb. 18, 1946 |
| 568,469 | Great Britain | Apr. 6, 1945 |
| 802,598 | France | June 13, 1936 |